(12) United States Patent
Vedurmudi

(10) Patent No.: US 8,340,058 B2
(45) Date of Patent: Dec. 25, 2012

(54) HEADPHONE WITH ENHANCED VOICE COMMUNICATION

(75) Inventor: Sriharsha Vedurmudi, Hyderabad (IN)

(73) Assignee: Nvidia Corporation, Santa Clara, CA (US)

( * ) Notice: Subject to any disclaimer, the term of this patent is extended or adjusted under 35 U.S.C. 154(b) by 939 days.

(21) Appl. No.: 11/926,149

(22) Filed: Oct. 29, 2007

(65) Prior Publication Data

US 2009/0109940 A1 Apr. 30, 2009

(51) Int. Cl.
*H04W 4/00* (2009.01)
*H04L 12/66* (2006.01)
*H04M 1/00* (2006.01)

(52) U.S. Cl. ............... 370/338; 370/352; 455/426.1; 455/552.1

(58) Field of Classification Search .................. None
See application file for complete search history.

(56) References Cited

U.S. PATENT DOCUMENTS

| | | | |
|---|---|---|---|
| 6,567,492 B2 | 5/2003 | Kiselev et al. | |
| 6,845,408 B1 | 1/2005 | Lemke et al. | |
| 7,054,659 B2 | 5/2006 | Gioscia et al. | |
| 7,693,546 B1 | 4/2010 | Gioscia et al. | |
| 2005/0190747 A1* | 9/2005 | Sindhwani et al. | 370/352 |
| 2007/0004400 A1* | 1/2007 | McClung | 455/426.1 |
| 2007/0049276 A1* | 3/2007 | Rimoni et al. | 455/436 |
| 2007/0091845 A1* | 4/2007 | Brideglall | 370/331 |
| 2007/0123323 A1* | 5/2007 | Zhu et al. | 455/575.2 |
| 2007/0159998 A1* | 7/2007 | Ruuska et al. | 370/328 |
| 2007/0263605 A1* | 11/2007 | Estevez et al. | 370/356 |
| 2007/0280200 A1* | 12/2007 | Patel | 370/352 |
| 2008/0004052 A1* | 1/2008 | Bloebaum et al. | 455/466 |
| 2008/0089289 A1* | 4/2008 | Jayaram et al. | 370/331 |
| 2008/0107051 A1* | 5/2008 | Chen | 370/310 |
| 2008/0161071 A1* | 7/2008 | Sherman | 455/574 |
| 2008/0198818 A1* | 8/2008 | Montemurro et al. | 370/338 |
| 2008/0291830 A1* | 11/2008 | Pernu et al. | 370/236 |
| 2008/0299987 A1* | 12/2008 | Iyer et al. | 455/454 |
| 2009/0022103 A1* | 1/2009 | Shatsky | 370/331 |
| 2009/0047991 A1* | 2/2009 | Elg | 455/552.1 |
| 2009/0104940 A1* | 4/2009 | Seshadri et al. | 455/563 |
| 2009/0310580 A1* | 12/2009 | Chapman et al. | 370/338 |
| 2009/0318085 A1* | 12/2009 | Seshadri et al. | 455/41.3 |
| 2009/0325650 A1* | 12/2009 | Seshadri et al. | 455/569.1 |
| 2010/0198935 A1* | 8/2010 | Stepanian | 709/208 |
| 2010/0235421 A1* | 9/2010 | Liu | 708/402 |

* cited by examiner

*Primary Examiner* — Clemence Han

(57) ABSTRACT

A headphone having ability to communicate using Internet Protocol (IP) standard. The capability may be used as a basis to facilitate a user to conduct voice calls using voice over IP (VOIP). The headphone may also facilitate voice calls with users connected via cellular networks (e.g., GSM, CDMA, etc.). In an embodiment, the headphone is provided a wireless LAN (WLAN) network interface such that VOIP calls are conducted using wireless medium. Similarly, a Bluetooth protocol type interface is also provided to communicate with a cellular phone and the communication forms the basis for the voice calls between the headphone and other cellular phones connected via the cellular network.

13 Claims, 5 Drawing Sheets

|   510   |    520    |
|---|---|
| Parameter | Value |
| SSID | Group 1 |
| Security Mode | 3 |
| Security Key | <Password> |
| Power Safe Profile | 2 |
| Auto Connect | 1 |
| Mode | 0 |

|   540   |    550    |
|---|---|
| Parameter | Value |
| Service Name | Internet |
| Service URL |  |
| Service Port |  |
| User Name | abcd |
| Password | <Password> |
| Auto Connect | 1 |

|   570   |    580    |
|---|---|
| Parameter | Value |
| Alert Type | 0 |
| User Response | 1 |
| Do not Distrub | 0 |

HEADPHONE WITH ENHANCED VOICE COMMUNICATION

BACKGROUND

1. Field of Disclosure

The present disclosure relates generally headphones and more specifically to headphones with enhanced voice communication.

2. Related Art

A headphone generally refers to an accessory used by users ("local users") in conducting voice communications. Voice communications entail listening to the voice of a remote user as well as talking to the remote user. Accordingly, headphones contain one or more speakers from which the voice signal of the remote user is reproduced, and a microphone into which the local user can speak. The microphone captures the local user's voice as an appropriate signal for eventual transmission to the remote user(s), party to the voice conversation.

Headphones often also contain arrangements such as straps, molded shapes, etc., necessary to keep the speaker(s) and microphone (as well as the headphone itself) in position. Thus, the arrangements operate to place the speakers around the ear(s) of a user and a microphone near the mouth (e.g., in front of the mouth, close to jaw/neck, etc.) of the user. Accordingly, headphones may be used for telephone conversation type voice communications, without having to use hands for holding a handset, thereby freeing the hands for other tasks.

In a prior approach, headphones are often used in conjunction with other base telephone sets (e.g., a cellular phone or a PSTN (Public Switched Telephone Network) phone), with wireless or wire-based communication being provided on a short haul (e.g., 1-30 meters) between the headphone and the base telephone set, while the base telephone set provides the connection with the telephone system of the remote users for the voice based communication. In general, the voice connection terminates at the base telephone sets, while the communication facility is provided between the headphone and the base telephone set using local protocols such as BlueTooth™, DECT (Digital Enhanced Cordless Telecommunications), etc.

It is generally desirable that headphones with enhanced voice communication be provided to users.

BRIEF DESCRIPTION OF THE DRAWINGS

Example embodiments will be described with reference to the following accompanying drawings, which are described briefly below.

FIGS. 5A-5C are tables depicting configuration details of a headphone with enhanced voice communication in one embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A headphone provided according to an aspect of the present invention includes the ability to send and receive packets according to Internet Protocol (IP). Such a capability may be used as a basis to provide voice over IP (VoIP) capability from the headphone. In an embodiment, the headphone is provided the ability to send the IP packets on wireless medium such that a user can conduct voice communications using VoIP without having wire-based connectivity from the headphone.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
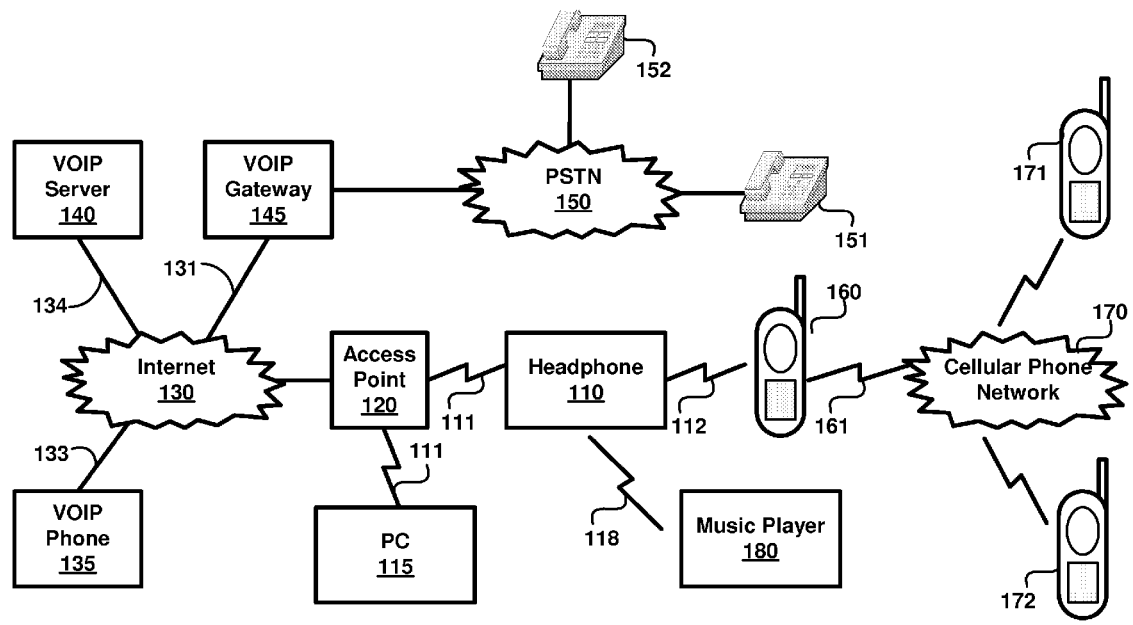
FIG. 1 is a block diagram illustrating an example environment in which several aspects of the present invention may be implemented.

FIG. 1 is a block diagram of an example environment in which several aspects of the present invention may be implemented. The voice communication system there is shown containing headphone 110, personal computer (PC) 115, access point 120, Internet 130, VoIP phone 135, VoIP server 140, VoIP gateway 145, PSTN 150, PSTN phones 151 and 152, cellular phones 161, 171 and 172, cellular phone network 170 and music player 180. Each block is described below assuming that a "local" user uses headphone and "remote" users use the other phones to conduct voice communications.

The block diagram is shown containing only representative systems for illustration. However, real-world environments may contain more/fewer/different systems/components/blocks, both in number and type, depending on the purpose for which the environment is designed, as will be apparent to one skilled in the relevant arts. For example, only a single access point and VoIP phone are shown, though a number of access points and VoIP phones may be present. Similarly, though a PSTN is shown connected through a VoIP gateway, alternative embodiments of the present invention may be operated without a VoIP gateway and PSTN.

Internet 130 represents a conglomeration of one or more constituent networks providing connectivity between VoIP Gateway 145, VoIP server 140, VoIP phone 135 and headphone 110 (through access point 120). Internet 130 may be implemented using protocols such as Internet Protocol (IP) well known in the relevant arts, with each of the systems also potentially operating consistent with IP.

VoIP phone 135 represents a voice communication device (e.g., personal computer system with appropriate components and interfaces, or specialized phones) designed to provide voice communication with other VoIP phones. VoIP phone 135 may convert voice signals produced by a remote user into digital data (digitize) and transport the converted digital data as IP packets to destination/remote phones over IP networks using VoIP technology. Similarly, IP packets received by VoIP phone 135 according to VoIP technology (containing voice signals, digitized by the sender) are converted back into voice signals and provided to the local user through sound reproduction devices such as speakers, thus enabling voice communication.

VoIP server 140 represents a server which enables or facilitates the general signaling functions such as setting up, modification and termination of voice communication using VoIP protocols. VoIP server 140 may first receive and store the destination address and other details (registration) needed for accessing respective ones of the VoIP phones. VoIP server 140 may then receive requests from other VoIP phones (initiating phone) indicating interest to connect with another (target) VoIP phone. VoIP server 140 provides the information needed (e.g., the present IP address) for the initiating phone to contact the target VoIP phone. The initiating phone may then request a session with the target phone. A VoIP server may be implemented using protocols such as SIP (Session Initiation Protocol), H.323, etc., well known in the relevant arts.

PSTN 150 together with telephones 151 and 152 (voice communication devices) constitute a public switched telephone network providing telephony services (e.g., voice calls between telephones), well known in the relevant arts.

VoIP gateway 145 represents a system which provides the necessary conversions to facilitate communication between telephones 151/152 (on PSTN) and VoIP phone 135 (as well as headphone 110 provided according to an aspect of the present invention). VoIP gateway 145 receives PSTN voice and signaling information and converts the voice and signaling information to a format compatible with VoIP protocols prior to sending the converted information to the destination VoIP phone over internet 130. VoIP gateway 145 also receives the VoIP packets destined to PSTN 150, converts the content of the packets into a format compatible with PSTN 150 and sends the converted information to PSTN 150. VoIP gateway 145 may be implemented in a known way.

Access point 120 provides wireless connectivity between internet 130 and headphone 110 over wireless path 111. Access point 120 may be implemented according to known standards for Wireless Local Area Networks (WLAN) such as IEEE802.11 set of standards from the Institute of Electrical and Electronics Engineers (IEEE).

PC 115 represents a system, which also connects to Internet 115 via access point 120 via wireless path 111. In general, PC 115 needs to be implemented consistent with the WLAN standard for medium access and with IP protocol stack as well to facilitate transmission of packets.

Cellular phone network 170 represents a communication network providing voice and data connectivity between cellular phones 160, 171 and 172. Cellular phone network may also provide voice and data connectivity between cellular phones (161, 171, 172) and other telephony networks such as PSTN, VoIP, etc. using appropriate gateways (not shown). Cellular phone network 170 may be implemented using technologies such as GSM, CDMA, etc., well known in the relevant arts.

Music player 180 represents a player which can play music, other audio, etc., (stored, streamed, received over radio, etc.). The audio output of music player 180 may be made available to headphone 110 over wireless path 118 using local protocols such as Bluetooth.

Headphone 110 provides enhanced communication facilities for a local user according to several aspects of the present invention. In an embodiment, the local user may, using headphone 110, communicate with a remote user at VoIP phone 135 over wireless path 111, access point 120 and internet 130. The local user may also communicate using cellular phone 160 over wireless path 112 and cellular network 170.

The voice of the local user may be carried from headphone 110 to cellular phone 160 and the voice of the remote user may be carried from cellular phone 160 to headphone 110 over wireless path 112 using local protocols such as Bluetooth. The voice communication from cellular phone 160 to remote users may be carried over cellular network 170 and associated gateways (not shown) well known in the relevant arts. The details of headphone 110 in several example embodiments are described below.

3. Headphone

Figure 2:
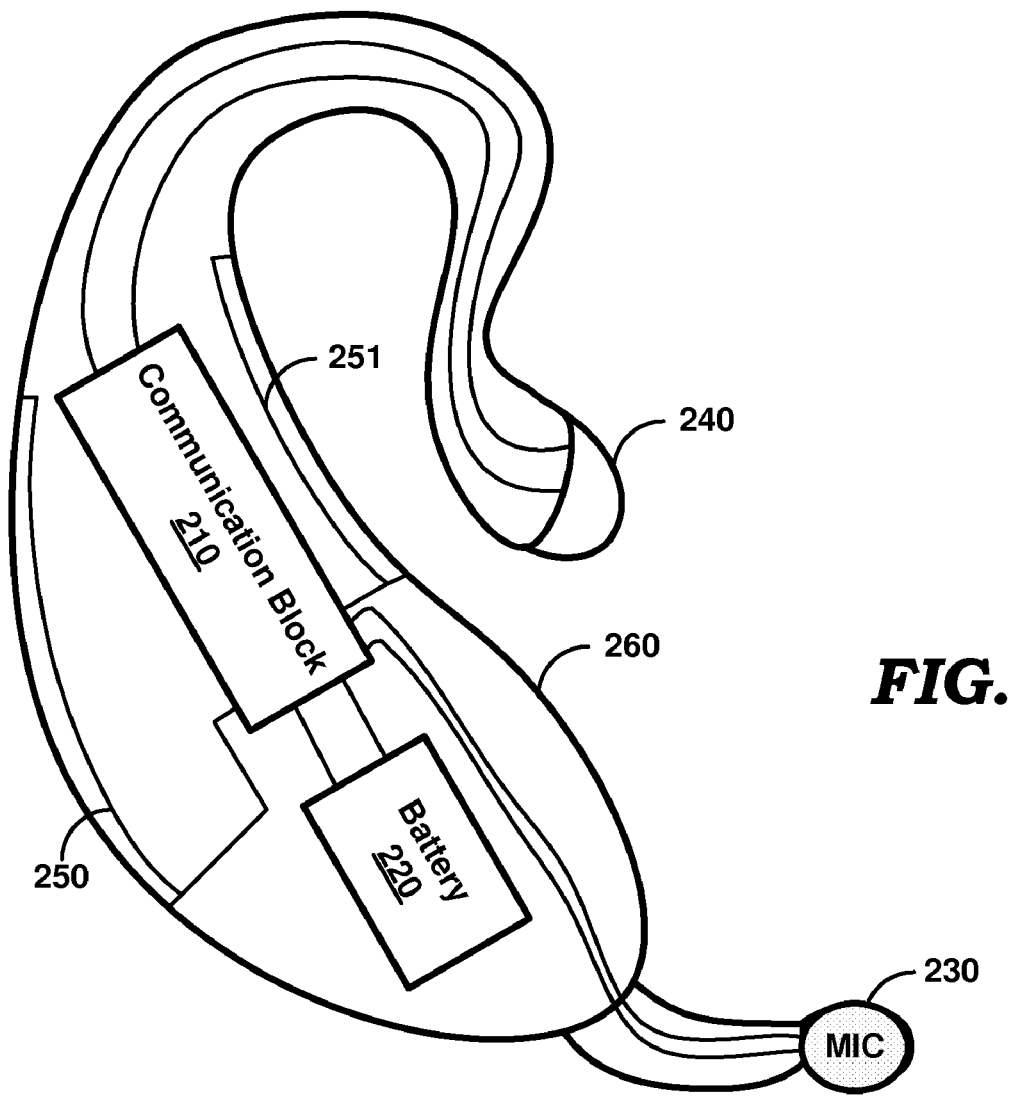
FIG. 2 is a block diagram illustrating the breakdown details of a headphone with enhanced voice communication in one embodiment of the present invention

FIG. 2 is a block diagram illustrating the details of headphone 110 with enhanced voice communication, in one embodiment of the present invention. Headphone 110 is shown containing communication block 210, battery 220, microphone 230, speaker 240, antenna 250 and enclosure 260. Each block is described in further detail below.

Again, merely for illustration, only representative number/type of blocks are shown in FIG. 2. However, headsets according to several aspects of the present invention can contain many more/fewer/different blocks, both in number and type, depending on the purpose for which the environment is designed, as will be apparent to one skilled in the relevant arts. For example, though communication block 210 is shown as one block, it may contain a number of chips. Similarly, though only one antenna 250 is shown, there may be more than one antenna.

Battery 220 represents a source of electrical energy for the operation of headphone 110. Battery 220 may contain one or more cells which may or may not be rechargeable, as is well known in the relevant arts.

Microphone 230 represents a component which converts voice (sound) of a local user into electrical signals representing the voice. The converted electrical signals may be further processed (amplified, digitized, etc.) in communication block 210 and transmitted to the desired destination (internet 130 through access point 120 over wireless path 111 or cellular phone 160 over wireless path 112, etc.) for eventual transmission to the remote user(s).

Speaker 240 represents a component which converts electrical signals representing sound into sound (voice of a remote user). Microphone 230 and speaker 240 together enable voice communication between a local user and remote user(s) (e.g., using cellular phone 171, VoIP phone 135 or PSTN phone 151).

Antennas 250 and 251 represent components designed to transmit and/or receive radio waves. Antennas 250 and 251 may enable wireless paths 111 and 112 to be established by transmitting/receiving RF signals to/from access point 120/cellular phone 160. While antennas 250 and 251 are shown as attached to enclosure 260, it may be appreciated that the antennas may be designed to be etched on a printed circuit board, etc. It may also be appreciated that while two antennas 250 and 251 are shown, only one antenna may be used for RF communication with access point 120 and with cellular phone 160, as is well known in the relevant arts.

Enclosure 260 represents a part enclosing all the components of headphone 110 merely to shield any unneeded exposure of the components, in addition to holding other components such as speaker and microphone in place. Enclosure 260 is shown designed in a shape which enables headphone 110 to be slipped behind an ear of a local user and kept in place without any additional attachments or fastening. It should be appreciated that the design of enclosure 260 and various other details provided herein, are merely exemplary. Various other alternative embodiments can be implemented without departing from the scope and spirit of several aspects of the present invention, as will be apparent to one skilled in the relevant arts by reading the disclosure provided herein.

Communication block 210 performs the tasks necessary for providing a headphone with enhanced voice communications, according to several aspects of the present invention. In addition, communication block 210 may provide for communication with music player 180 and cellular phone 160. The description is continued with the details of communication block 210 in example embodiments below.

4. Communication Block

Figure 3:
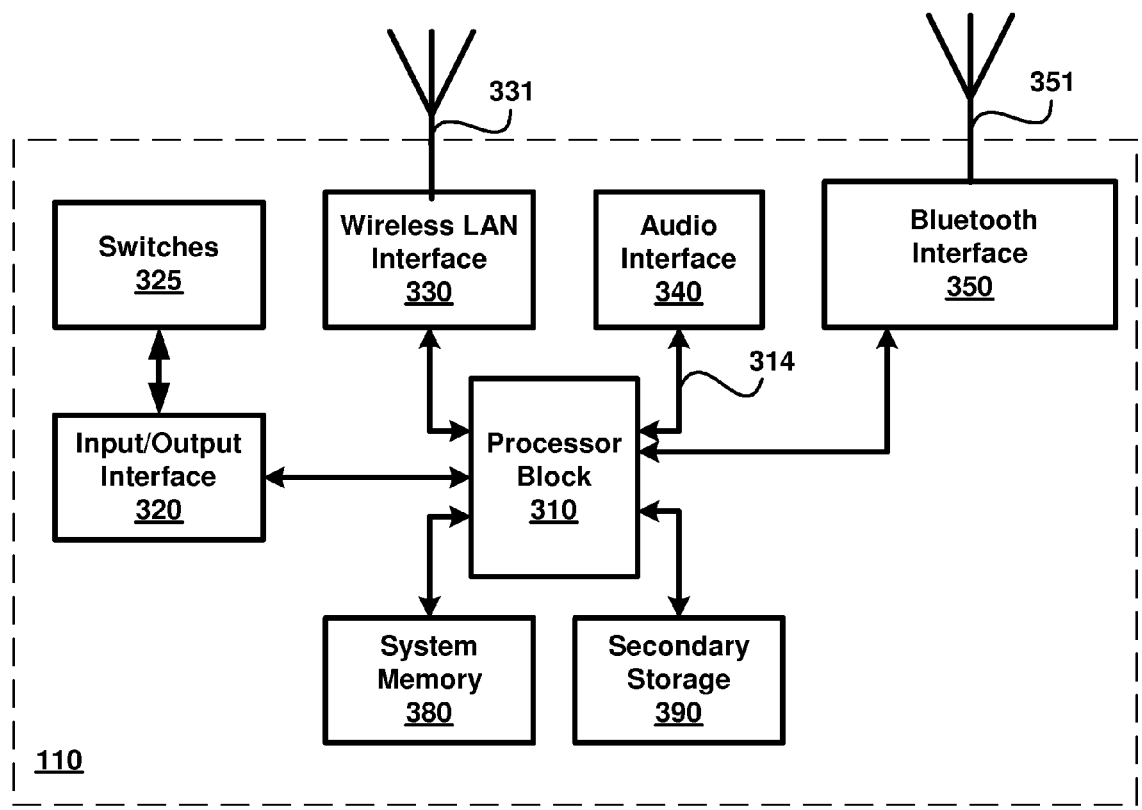
FIG. 3 is a block diagram illustrating the details of a headphone with enhanced voice communication in one embodiment of the present invention.

FIG. 3 is a block diagram illustrating the details of a communication block in an embodiment of the present invention. Communication block 210 is shown containing processor block 310, input/output (I/O) interface 320, switches 325, wireless LAN interface 330, audio interface 340, bluetooth interface 350, system memory 380 and secondary storage 390. Each block is described in further detail below. Once again, merely for illustration, only representative number/type of blocks are shown in FIG. 3.

System memory 380 contains randomly accessible locations to store program (instructions) and/or data, which are used by processor 310 during operation of headset 110. The data and instructions may be retrieved from secondary storage 390. The data retrieved may correspond to various configuration data (indicating different information such as wireless LAN parameters, Bluetooth parameters, user selectable parameters, etc.) for headphone 110. System memory 380 may contain RAM (e.g. SRAM, SDRAM, DDR RAM, etc.), non-volatile memory (e.g. ROM, EEPROM, Flash Memory, etc.) or both.

In general, processor 310 may execute the instructions using the data (both in secondary storage 390) to enable headset 110 to provide enhanced voice communication.

Secondary memory 390 may store (on a non-volatile memory) the data and software instructions, which enable headphone 110 to provide several features in accordance with the present invention. Secondary storage 390 may be implemented using persistent memory such as hard drives, flash memory, removable storage drives, etc., and represents a computer readable medium from which instructions can be read and executed by processor block 310 to provide several features of the present invention.

Input/Output (I/O) interface 320 together with switches 325 provides a local user with the facility to provide inputs, for example, to answer a call, to mute the microphone, etc. by pressing respective switches 325. Thus, switches 325 logical represent parts, which can be operated by a local user for providing various inputs during operation as VoIP/PSTN phone or to listen to music.

Wireless LAN interface 330 represents an interface which provides connectivity between headphone 110 and internet 130 over wireless path 111. Wireless LAN interface 330 provides the physical (antenna, etc.), electronic (transmitter, receiver, etc.) and WLAN protocol (IEEE 802.11 standards etc.) interfaces necessary for headphone 110 to communicate with internet 130 over wireless path 111 through access point 120. WLAN interface 330 forwards digital representation of the data in each received packet to processor block 310 and transmits digital data received from processor 310 to the wireless medium (111) using antenna 331. Wireless LAN interface 330 may be implemented in a known manner.

Bluetooth interface 350 provides short haul connectivity between headphone 110 and cellular phone 160, music player 180, etc., for example, using Bluetooth protocol type technologies. As is well known, Bluetooth protocol is a wireless communication protocol for short haul (of the order of a hundred meters or less) exchange of data (which may include data representing voice communication) between Bluetooth enabled devices such as headphones (such as headphone 110), cellular phones (such as cellular phone 160), music players (such as music player 180), printers, digital cameras, etc.

Thus, Bluetooth interface 350 provides the physical (antenna, etc.), electronic (transmitter, receiver, etc.) and protocol interfaces necessary for head phone 110 to communicate with Bluetooth enabled accessories and devices. Bluetooth interface 350 forwards digital representation of the data in each received packet to processor block 310 and transmits digital data received from processor 310 to the wireless medium (112/118) using antenna 351. It may be appreciated that headphone 110 may be provided with other technologies for short haul connectivity (such as UWB (Ultra Wide Band), Zigbee, etc.) instead of/in addition to Bluetooth.

Audio interface 340 captures the audio signal from the local user (through microphone 230), forms digital data representing the captured signal, and forwards the signal to processor block 310. Audio interface 340 receives digital data representing a voice signal and reproduces the voice signal in an audible form for the local user. The voice signal can be either received from a remote user, music player 180, or represent locally generates signals such as voice, alerts, etc.

Processor block 310 enables the voice communications and listening of music by interfacing with the other components described above. Processor block 310 may be implemented with one or more processing units (each potentially adapted for specific task) executing the software instructions. The software instruction may need to be implemented consistent with the various protocols, etc., (which can depend on the environment of operation) to provide the desired voice communication. The details of implementation of the software instructions in conjunction with processor block 310 in an example embodiment are described below.

5. Processor Block

Figure 4:
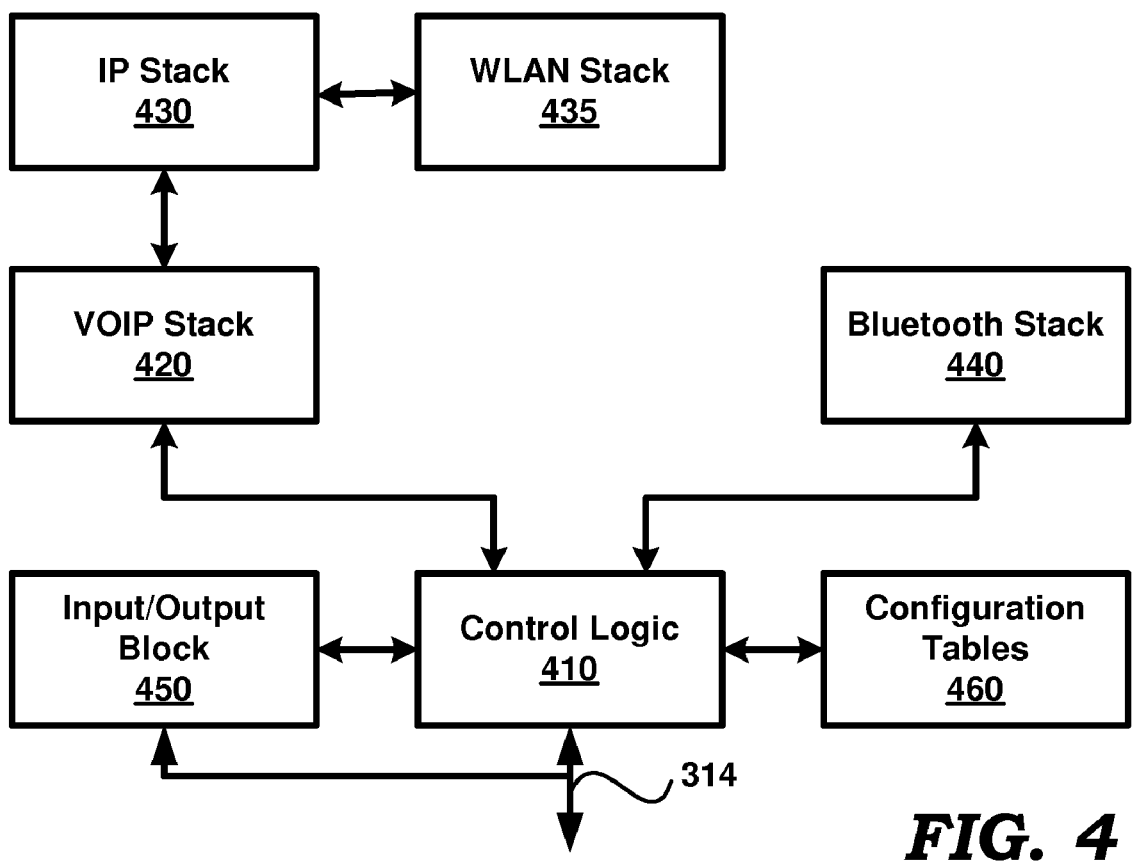
FIG. 4 is a block diagram illustrating the operation of the processor block in a headphone with enhanced voice communication in one embodiment of the present invention.

FIG. 4 is a block diagram illustrating the general features that may be implemented associated with processor block 310 in an embodiment. The block diagram is shown containing control logic 410, VoIP stack 420, IP stack 430, WLAN stack 435, Bluetooth stack 440, input/output (I/O) block 450, configuration tables 460. Each block is described below in further detail.

VoIP stack 420 facilitates the setting up of voice calls (including initiating a call with a remote user as well as accepting a call request received from a remote user) and to conduct voice communications thereafter by interfacing with control logic 410. With respect to voice of local user, a data stream (ordered sequence of bytes/bits) representing the voice received from control logic 410, and sent to the remote user using IP stack 430. With respect to voice of remote user, a data stream representing the voice is received from IP stack and forwarded to control logic 410. VoIP stack 420 may be implemented using protocols such as SIP and H.323.

IP stack 430 sends the data stream received from VoIP stack 420 to the appropriate destination. Thus, for signaling related functions (call setup, etc.), the corresponding data may be encapsulated in IP packets having a destination IP address (in the corresponding destination address field, as described in the corresponding Request For Comments) equaling that of VoIP server 140. The data representing captured voice may be sent in packets having an IP address of VoIP phone 135 or VoIP gateway 145, depending on the phone used by the remote user.

When IP packets representing voice signal are received from a remote user, the headers are stripped and the data representing the voice signal is sent as a data stream to control logic 410. Though not shown, control logic 420 may directly interface with IP stack 430 at least for sending packets related to non-VoIP operations.

WLAN stack 435 is implemented consistent with protocols such as IEEE 802.11, and operates to transmit each IP packet received from IP stack 430. The IP packets may be encapsulated in a form suitable to be sent to access point 120 and sent on wireless path 111. Similarly, WLAN stack 435 receives each wireless packet and sends the contained IP packet to IP stack 430.

Bluetooth stack 440 operates to transmit/receive packets on wireless path 112 (forming the basis for the cellular phone calls and listening to music in the example of FIG. 1), and can be implemented in a known way.

Input/Output (I/O) block 450 operates to process the various inputs provided by the user, including those by operating switches 325. Data representing the inputs is provided to control logic 410 for appropriate processing. In an embodiment, the I/O block includes the capability to receive user inputs as voice commands. Accordingly, the voice signal on path 314 may be examined to determine the specific voice command (such as accept a call, reject a call, etc.) being provided by the user.

I/O block 450 thus extracts voice commands from local user to control the operation of headphone 110 and sends the commands to control logic 410 for controlling the operation of headphone 110 accordingly. Control logic 410 may indicate specific contexts at which I/O block 450 is to examine the voice data for commands.

Control logic 410 operates to support the voice communications and listening to music, noted above. Thus, with respect to listening to music, the packets received from Bluetooth interface are sent to audio interface 340 for reproduction as an audible signal. With respect to voice signal received from Bluetooth stack 440 (for cell phone calls) or from VoIP stack (for VoIP calls), the corresponding data is forwarded to audio interface 340 on path 314. With respect to voice data received from audio interface 340, control logic operates in conjunction with VoIP stack 420 (in case of VoIP calls) or Bluetooth stack 440 (in case of cellular calls) to cause the voice data to be transmitted on the corresponding wireless path.

Configuration tables 460 store various configuration data (indicating information such as wireless LAN parameters, Bluetooth parameters, IP parameters, user selectable parameters, etc.) required for configuring headphone 110. The description is continued with examples of configuration tables in an embodiment of the present invention.

6. Configuration Tables

FIGS. 5A-5C depicts logically the configuration tables stored in secondary storage 390 in an embodiment. It should be appreciated that only some of the relevant entries/details of the configuration tables are shown/described for conciseness. However, various other details (e.g., whether the headphone is DHCP enabled for dynamic allocation of the (local) IP address, and if not, the specific IP address to be allocated to the headphone) may also be stored in the configuration tables, as will be apparent to one skilled in the relevant arts by reading the disclosure provided herein.

FIG. 5A depicts the parameters which may be used for configuring the wireless LAN connectivity of headphone 110. Table 501 is shown having two columns (510, 520) and six rows (511-516). Column 510 lists the parameter names for wireless LAN connectivity and column 520 shows the corresponding values, assuming that the wireless LAN is set up using Wi-Fi technology.

Row 511 names a parameter "SSID" (Service Set Identifier) which has a text "Group 1" as the value. SSID identifies the wireless network to which headphone 110 is to be connected, by a text specified. In the example, the wireless network is identified by name "Group 1".

Row 512 specifies the "Security Mode" for the wireless LAN connection as 3. Mode 3 is specified as WPA2 (Wi-Fi Protected Access 2). The other modes are Mode 0 (open), Mode 1 (WEP—Wired Equivalent Privacy) and Mode 2 (WPA—Wi-Fi Protected Access).

Row 513 specifies "Security Key" which is a password required for connecting to the WI-Fi network.

Row 514 specifies the "Power Save Profile" which is shown as "2" which is for the highest power saving, others being 1 (for VoIP use) and 0 (for no power saving mode). Power saving modes may be used to conserve battery power by turning off those components (such as RF interfaces, amplifiers, etc.) of the circuit which are not being used for a period of time, and turning them on when the component needs to be used again. In the "VoIP" mode of power saving, headphone 110 may enter a "sleep mode" (where the equipment is powered down except for a mechanism such as a timer, to wake the equipment periodically) when there is no activity (voice data being sent or received as packets) for a predetermined period of time (for example, 50 milliseconds).

Headphone 110 may wake up when there is voice data to be sent. Headphone 110 may also wake up periodically to check for packets (representing voice data from a remote user) addressed to headphone 110 (the packets for headphone 110 in sleep mode may be buffered in the respective access point till headphone 110 wakes up) and going into sleep mode again after completing pending network transactions if any. Processor 310 and the other components may accordingly be designed cooperatively in a known way.

Row 515 shows whether Auto connect is enabled (value=1) or disabled (value=0) which determines whether when a wireless network is detected, headphone 110 should connect automatically (when value=1) or should not connect automatically (value=0). In case of a value of 0, the user may provide the appropriate input using switches 325 to cause the connection to be established.

Row 516 is set to one value (0) to indicate that the user wishes to communicate in ad-hoc mode (IBSS, i.e., point-to-point with a user without any additional infrastructure in between) and to another value (1) to indicate that the communications are to occur via the WLAN infrastructure (Access Point, etc.) described above.

FIG. 5B depicts the parameters which may be used for configuring the VoIP service. Rows 551-556 respectively specify the service name (an understandable label/identifier, for user convenience), service URL (the URLIP address at which the VoIP server is accessible), service port (the TCP/UDP port at which the VoIP service can be contacted during call setup), user name (to register in the VoIP server and also for authentication), the password (corresponding to the user name), and auto connect (similar to 515).

FIG. 5C depicts the parameters which may be used for setting various user preferences. Row 581 is set to an appropriate value to indicate the specific alert type (beep/vibrate/voice, etc.) desired, row 582 is set to indicate user preference to provide inputs by switches and/or voice commands, and row 583 is set to indicate whether the user wishes not to be disturbed (do not disturb, features).

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A voice communication system comprising:
   a plurality of voice communication devices connected to Internet based on Internet Protocol (IP);
   a first wireless network connecting to said internet;
   a cellular phone to communicate on a cellular network; and
   a headphone designed to connect to said first wireless network and provide voice communication with said plurality of voice communication devices based on voice over IP (VOIP), said headphone also designed to connect to said cellular network via said cellular phone and provide voice communication through said cellular phone.

2. The voice communication system of claim 1, further comprising a second wireless network connecting said headphone with said cellular phone, wherein said headphone connects with said cellular phone based on said second wireless network.

3. The voice communication system of claim 2, wherein said first wireless network connects to said internet using a first wireless protocol, and said second wireless network connects to said cellular phone using a second wireless protocol, wherein said first wireless protocols is different from said second wireless protocol.

4. The voice communication system of claim 3, wherein said first wireless protocol comprises a Wireless Local Area Network protocol and said second wireless protocol comprises Bluetooth protocol.

5. A headphone comprising:
   a microphone to capture a first voice signal from a local user;
   a speaker to produce a second voice signal to said local user;
   an antenna to transmit data to and receive data from a wireless network;
   a processor block to send a first packet using said antenna to a remote user on said wireless network, said processor block to receive a second packet using said antenna from said remote user on said wireless network, wherein each of said first packet and said second packet is according to Internet Protocol (IP), wherein said first packet and said second packet form the basis for a voice communication between said local user and said remote user, wherein said first packet represents said first voice signal in digital format and said second packet represents said second voice signal also in digital form; and
   said processor block also for providing voice communication on a cellular network via a wireless connection to a cellular phone.

6. The headphone of claim 5, wherein a local IP address is assigned to said headphone and wherein a remote voice communication device is identified by a remote IP address, wherein said first packet has said remote IP address in a destination IP address field, wherein said second packet has said local IP address in said destination IP address field.

7. The headphone of claim 6, wherein said processor block is designed to communicate with a VOIP server to determine said remote IP address at which said remote user is present.

8. The headphone of claim 6, wherein said processor block is designed to enable said local user to conduct another voice call via a cellular phone to a cellular network.

9. The headphone of claim 8, further comprising a first wireless interface which interfaces with said wireless network using a first wireless protocol, and a second wireless interface which interfaces with said cellular phone using a second wireless protocol.

10. The headphone of claim 9, wherein said first wireless protocol comprises a Wireless Local Area Network protocol and said second wireless protocol comprises Bluetooth protocol.

11. A headphone comprising:
    a microphone to capture a first voice signal from a local user;
    a speaker to produce a second voice signal to said local user;
    an antenna to transmit data to and receive data from a wireless network;
    a processor block to send a first packet using said antenna to a remote user on said wireless network, said processor block to receive a second packet using said antenna from said remote user on said wireless network, wherein each of said first packet and said second packet is according to Internet Protocol (IP); and
    said processor block also for providing voice communication on a cellular network via a wireless connection to a cellular phone.

12. The headphone of claim 11, wherein said first packet is sent to a voice communication device and said second packet is received from said voice communication device, wherein said first packet and said second packet form the basis for a voice over IP (VOIP) communication between said local user and a remote user using said voice communication device.

13. The headphone of claim 12, wherein said first packet contains data representing said first voice signal in digital format.

* * * * *